(12) United States Patent
Reinhart et al.

(10) Patent No.: US 8,115,351 B2
(45) Date of Patent: Feb. 14, 2012

(54) HYBRID TRANSMISSION HIGH VOLTAGE CONNECTOR AND TERMINAL BLOCK COOLING SYSTEM AND METHOD

(75) Inventors: Timothy J. Reinhart, Brownsburg, IN (US); Kevin P Coleman, Livonia, MI (US); Eric S. Tryon, Indianapolis, IN (US); William S. Reed, Greenfield, IN (US); Grantland I. Kingman, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 12/474,693

(22) Filed: May 29, 2009

(65) Prior Publication Data

US 2010/0300797 A1 Dec. 2, 2010

(51) Int. Cl.
 *H02K 9/00* (2006.01)
(52) U.S. Cl. ............................................ 310/53; 310/52
(58) Field of Classification Search ............... 310/52–59
 See application file for complete search history.

(56) References Cited

U.S. PATENT DOCUMENTS

| | | | | |
|---|---|---|---|---|
| 5,212,432 A | * | 5/1993 | Ohtani et al. | 318/568.11 |
| 5,914,872 A | * | 6/1999 | Kramer | 363/141 |
| 5,939,808 A | * | 8/1999 | Adames | 310/89 |
| 6,191,511 B1 | * | 2/2001 | Zysset | 310/60 A |
| 7,679,234 B1 | * | 3/2010 | Tilton et al. | 310/54 |
| 2005/0206250 A1 | * | 9/2005 | Steffen et al. | 310/59 |
| 2007/0035187 A1 | | 2/2007 | Verhaegen | |
| 2008/0136271 A1 | | 6/2008 | Alfermann et al. | |
| 2008/0143201 A1 | | 6/2008 | Ramy et al. | |

* cited by examiner

*Primary Examiner* — Thanh Lam
(74) *Attorney, Agent, or Firm* — Quinn Law Group, PLLC

(57) ABSTRACT

A cooling system for an electrically variable transmission includes an electric motor having a plurality of connectors. The plurality of connectors are each assembled within a plurality of connector openings in a terminal block. Fluid from within a passageway is supplied by a pressurized fluid source, and an orifice for the passageway is located adjacent to one of the plurality of connector opening. The fluid flowing from the passageway is directed onto one of the plurality of connectors.

16 Claims, 4 Drawing Sheets

US 8,115,351 B2

HYBRID TRANSMISSION HIGH VOLTAGE CONNECTOR AND TERMINAL BLOCK COOLING SYSTEM AND METHOD

TECHNICAL FIELD

The present invention relates, generally, to an electric motor for a hybrid transmission, and more specifically, to cooling the electric motor.

BACKGROUND OF THE INVENTION

Hybrid transmissions have electric motor/generators located within the transmission housing. The electric motor/generator includes a stator and a rotor mounted on a shaft and rotatable relative to the stator. In order to ensure optimal performance and reliability, the motor/generators typically have an internal cooling arrangement.

In addition, the stators have stator windings which lead to connectors for the motor. The connectors are secured to a terminal block. Due the amount of electrical energy passing through the connectors and the terminal block, heat is generated. However, the internal cooling arrangement of the transmission does not directly contact the connectors and the terminal block. To assist in cooling the connectors and the terminal block, oil splash is usually directed at the terminal block. However, the oil splash does not reach the connectors, which are generating the heat.

SUMMARY OF THE INVENTION

A cooling system for an electrically variable transmission is provided. The cooling system includes a first electric motor having a first plurality of connectors. A first terminal block defines a first plurality of connector openings. The first plurality of connectors are each assembled within a respective one of the first plurality of connector openings. A first passageway defines a first orifice. Fluid from within the first passageway is supplied by a first pressurized fluid source, and the first orifice is located adjacent to one of the connector openings. The fluid flowing from the first passageway is directed onto one of the connectors.

A method for cooling an electric motor within an electrically variable transmission includes providing a first passageway fluidly connected to a first pressurized fluid source. The first pressurized fluid source is a first transmission component that is connected to a main transmission cooling system. Fluid from within the first passageway is directed onto a first plurality of connectors for a first electric motor.

A method for cooling a plurality of electric motors includes providing a first passageway fluidly connected to a first pressurized fluid source and providing a second passageway fluidly connected to a second pressurized fluid source. Fluid from within the first passageway is directed onto a first plurality of connectors for a first electric motor and fluid from within the second passageway is directed onto a second plurality of connectors for a second electric motor.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
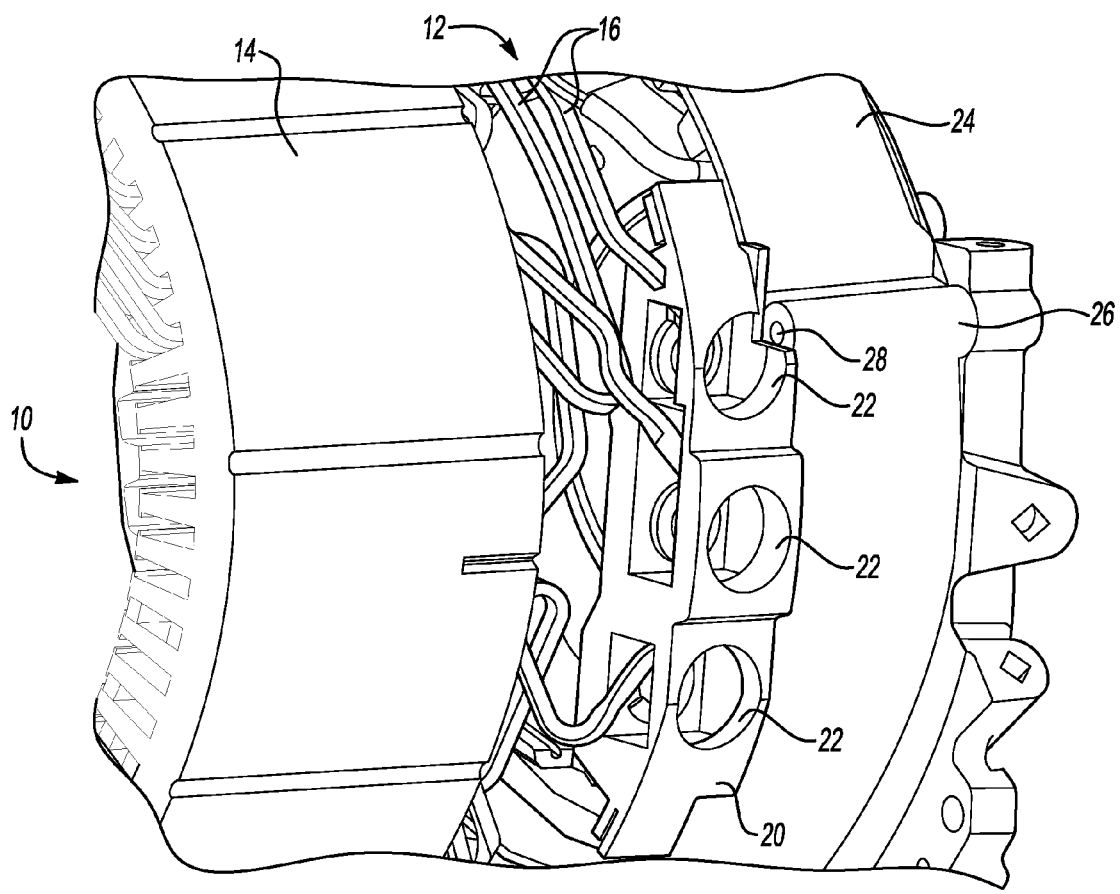
FIG. 1 is a schematic illustration of a partial perspective view of a first motor/generator for a hybrid transmission having a connector and terminal block cooling system.
Figure 2:
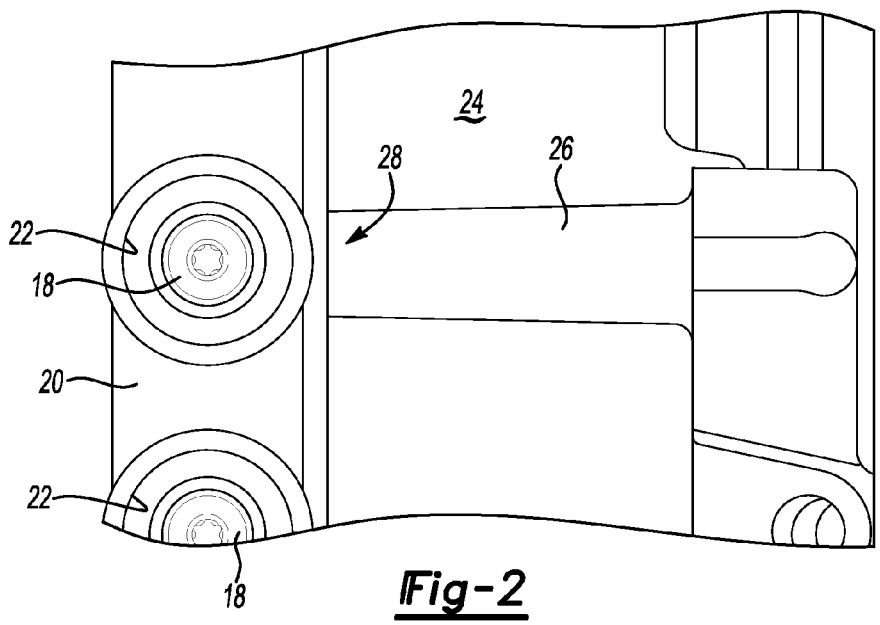
FIG. 2 is a schematic illustration of a side view of a first motor/generator illustrating a connector, terminal block and cooling dispenser for the cooling system of FIG. 1.
Figure 3:
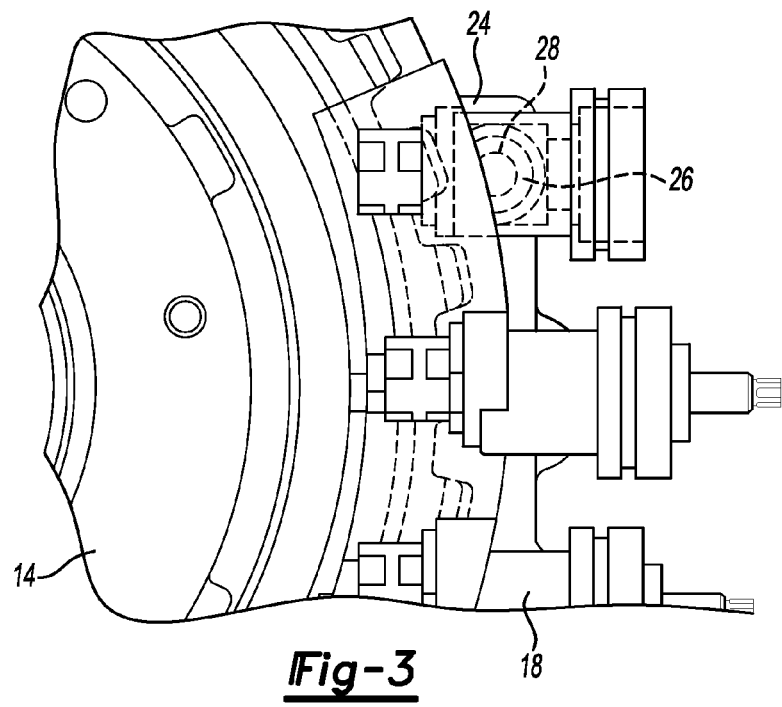
FIG. 3 is a schematic illustration of a top view of the first motor/generator illustrating the connector, terminal block and the cooling dispenser for the cooling system of FIGS. 1 and 2.

Referring to the Figures, wherein like reference numbers refer to the same or similar components throughout the several views, FIGS. 1-3 illustrate a first motor/generator 10 for a transmission 12. The motor/generator 10 has a stator 14 with stator windings 16. The stator winding 16 lead to connectors 18. The connectors 18 are assembled within the terminal block 20. The terminal block 20 is typically made from synthetic material and formed with a plurality of connector openings 22 for receiving each of the connectors 18.

In the embodiment shown the first motor/generator 10 is located adjacent to a clutch housing 24 for one of the transmission 12 clutches. A first passageway 26 is formed in the clutch housing. The first passageway 26 defines a first orifice 28 which is located next to one of the plurality of connector openings 22 formed in the terminal block 20. The opposing end of the first passageway 26 is connected to an oil source (not shown). For example, the oil source may be an oil passage in the clutch housing 24. The oil is from a pressurized source such that oil is sprayed from the first passageway 26 directly onto one of the plurality of connectors 18. A valve or other type of restrictor (not shown) may control the amount of oil flowing through the first passageway 26. Terminal block passageways 30 (Shown in FIGS. 7 and 8) assist in distributing the oil around the plurality of connectors 18 and the terminal block 20. Some of the oil may reach the stator windings 16 and cool them as well. After cooling the plurality of connectors 18 and the terminal block 20, the oil drains to a sump portion of the transmission 12. Directly spraying the oil onto the plurality of connectors 18 provides for faster and more effective cooling.

Figure 4:
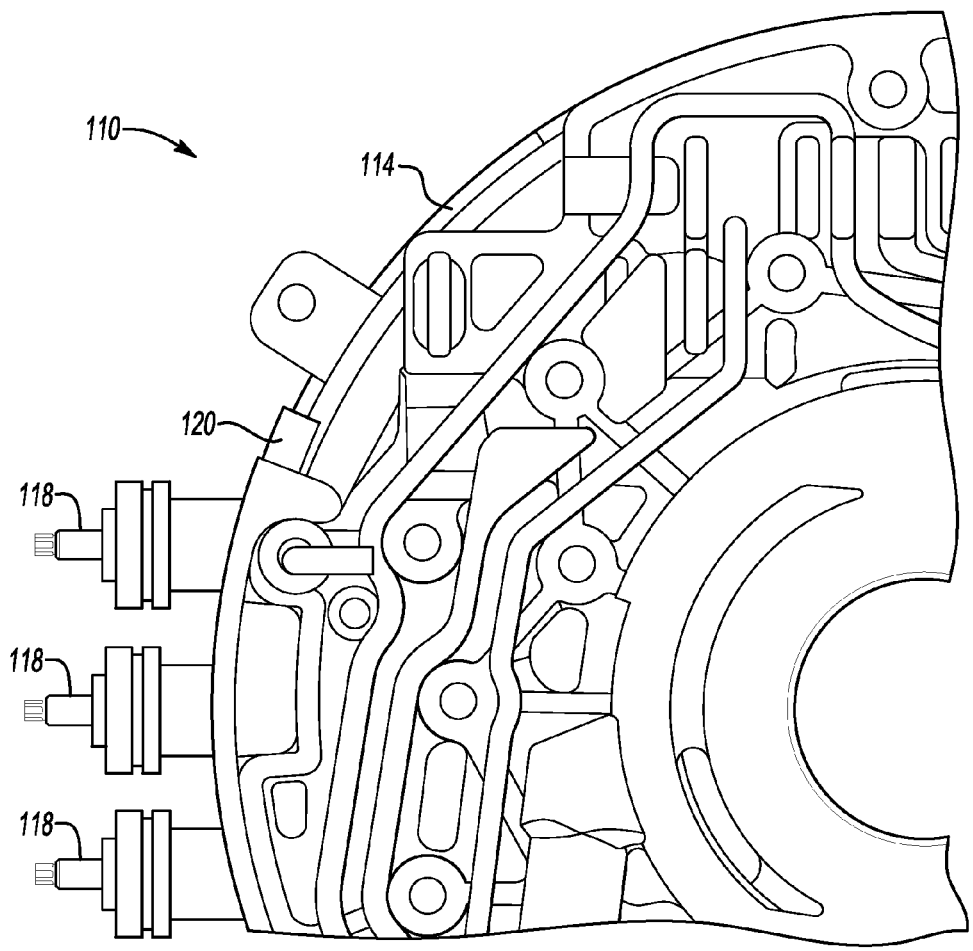
FIG. 4 is a schematic illustration of a top view of a second motor/generator illustrating a connector, terminal block and cooling dispenser for the cooling system of FIG. 2.
Figure 5:
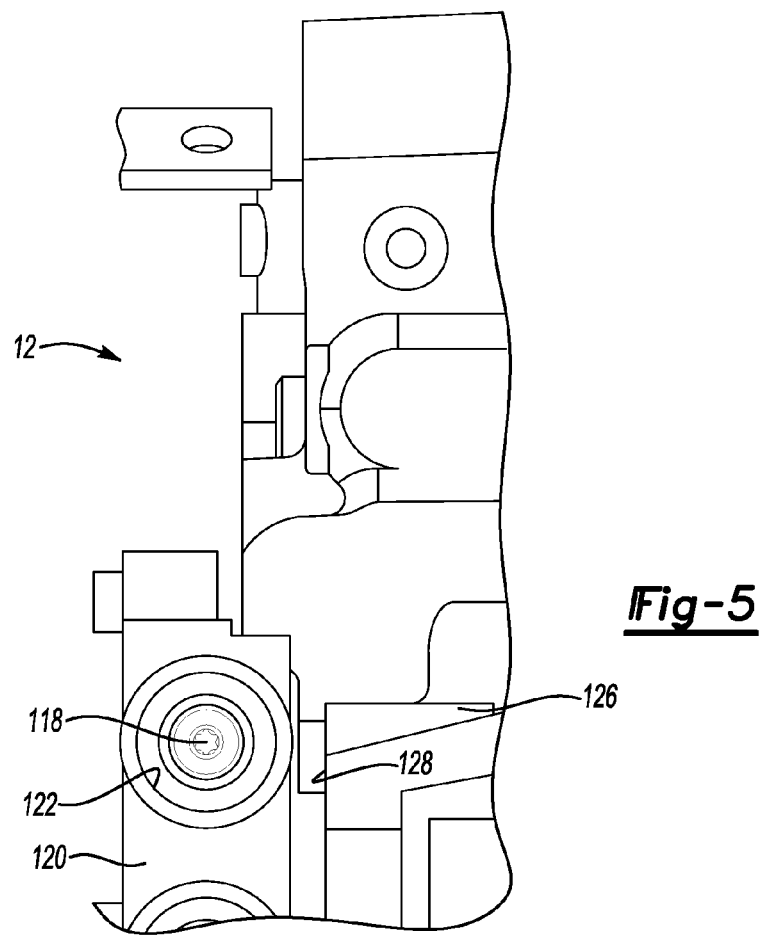
FIG. 5 is a schematic illustration of a side view of the second motor/generator illustrating the connector, terminal block and the cooling dispenser for the cooling system of FIGS. 1 and 4.
Figure 6:
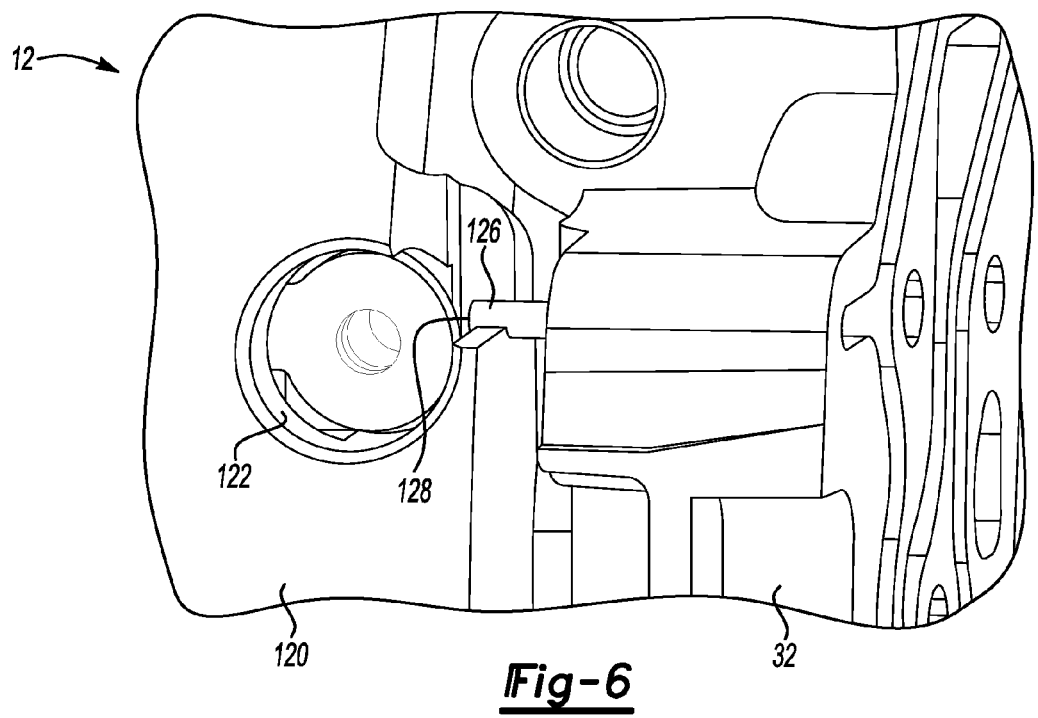
FIG. 6 is a schematic illustration of a perspective view of the first motor/generator illustrating the connector, terminal block and cooling dispenser for the cooling system of FIGS. 1, 4 and 5.

FIGS. 4-6 illustrate a second motor/generator 110 for the transmission 12. The motor/generator 110 has a stator 114 with stator windings 116. The stator windings 116 lead to connectors 118. The connectors 118 are assembled within the terminal block 120. The terminal block 120 is typically made from synthetic material and formed with a plurality of connector openings 122 for receiving each of the connectors 118.

In the embodiment shown the second motor/generator 110 is located adjacent to a main pump 32 for one of the transmission 12. A second passageway 126 is formed in the main pump 32. The second passageway 126 defines a second orifice 128 which is located next one of the plurality of connector openings 122 formed in the terminal block 120. The opposing end of the second passageway 126 is connected to an oil source (not shown). For example, the oil source may be a oil passage in the main pump 32, or an oil passage exiting the from the main pump 32. The oil is from a pressurized source such that oil is sprayed from the second passageway 126 directly onto one of the plurality of connectors 118. A valve or other type of restrictor (not shown) may control the amount of oil flowing through the second passageway 126. Terminal block passageways 130 (Shown in FIGS. 7 and 8) assist in distributing the oil around the plurality of connectors 118 and the terminal block 120. Some of the oil may reach the stator windings 16 and cool them as well. After cooling the plurality of connectors 118 and the terminal block 120, the oil drains to a sump portion of the transmission 112. Directly spraying the oil onto the plurality of connectors 118 provides for faster and more effective cooling.

Referring to FIGS. 1-6, the first passageway 26 and the second passageway 126 may be formed in any component of the transmission 12 that is adjacent to the first motor/generator 26 and the second motor/generator 126. The direction of oil spray from the first orifice 28 or the second orifice 128 is not of significance. However, the distance between the first orifice 28 or the second orifice 128 and the plurality of connectors 18, 118 is determined to achieve the maximum amount of oil spray and distribution over the plurality of connectors 18, 118 and the terminal blocks 20, 120. One skilled in the art would know the optimal locations for the first passageway 26, the first orifice 28 and the second passageway 126 and second orifice 128. As shown, the first passageway 26 and the second passageway 128 may lead from different oil sources.

Figure 7:
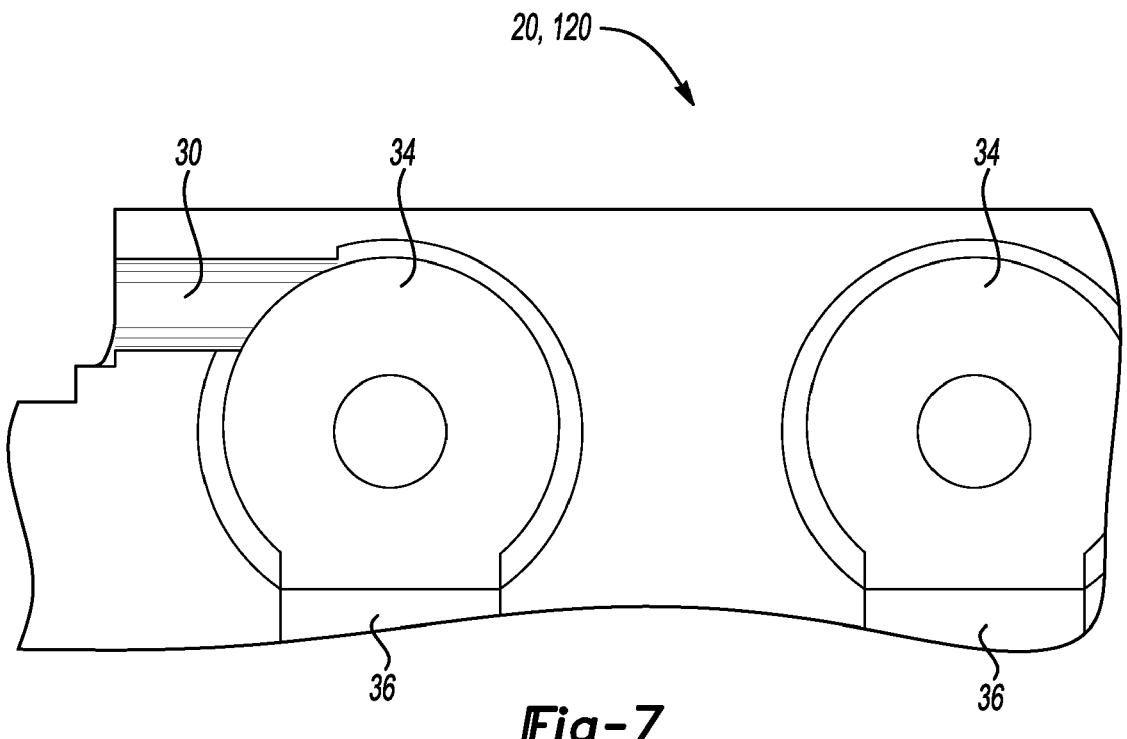
FIG. 7 is a schematic illustration of a front view of a terminal block for the first and second motor/generators illustrating the cooling system of FIGS. 1-6.
Figure 8:
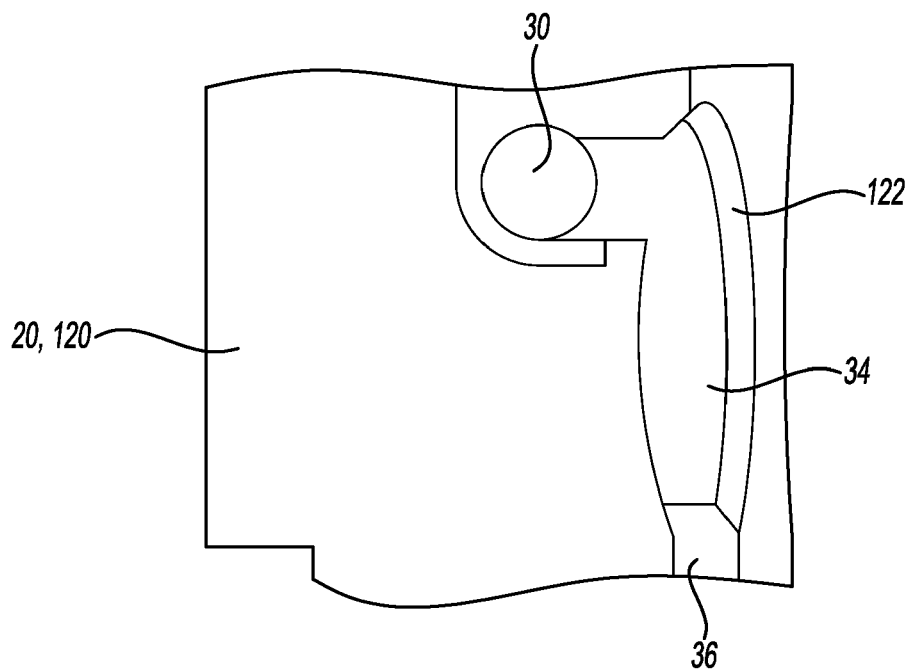
FIG. 8 is a schematic illustration is a perspective side view of a terminal block for the first and second motor/generators illustrating the cooling system of FIGS. 1-7.

Referring to FIGS. 7 and 8, enlarged portions of the terminal block 20, 120 are shown. The terminal block 20, 120 defines terminal block passageways 30 that allow the oil to flow through the terminal block 20, 120. The recessed areas 34 are formed in the terminal block 20, 120 to allow oil flow around the plurality of connectors 18, 118 (shown in FIGS. 2-5). The terminal block passageways 30 may also between the recessed areas 34 to assist in oil flow around the plurality of connectors 18, 118. Providing the oil from a pressurized oil source and gravity both assist in distributing the oil through the terminal block 20, 120 and around the plurality of connectors 18, 118. The oil drains from the bottom 36 of the recessed areas 34 to a sump of the transmission 12. Directly spraying the oil onto the plurality of connectors 18, 118 provides for faster and more effective cooling. In addition, the terminal block passageways 30 allow for cooling throughout the terminal block 20, 120 rather then relying on oil splash on the exterior of the terminal block 20, 120

While the best modes for carrying out the invention have been described in detail, those familiar with the art to which this invention relates will recognize various alternative designs and embodiments for practicing the invention within the scope of the appended claims.

The invention claimed is:

1. A cooling system for an electrically variable transmission comprising:
a first electric motor having a first plurality of connectors;
a first terminal block defining a first plurality of connector openings, wherein the first plurality of connectors are each assembled within a respective one of the first plurality of connector openings;
a first component defining a first passageway and a first orifice, wherein fluid in the first passageway is supplied by a first pressurized fluid source; and
wherein the first orifice is located adjacent to one of the first plurality of connector openings, such that fluid flowing from the first passageway is directed onto one of the first plurality of connectors.

2. The cooling system of claim 1, further comprising:
a second electric motor having a second plurality of connectors;
a second terminal block defining a second plurality of connector openings, wherein the second plurality of connectors are each assembled within a respective one of the second plurality of connector openings;
a second component defining a second passageway and a second orifice, a second passageway defining a second orifice wherein fluid in the second passageway is supplied by a second pressurized fluid source; and
wherein the second orifice is located adjacent to the second plurality of connector openings, such that fluid flowing from the second passageway is directed onto one of the second plurality of connectors.

3. The vehicle of claim 2, wherein the first component is a clutch housing for a transmission clutch and the second component is a main pump housing for a main transmission pump.

4. The vehicle of claim 1, wherein the terminal block defines a plurality of terminal block passageways, and wherein the terminal block passageways are fluidly connected with the first plurality of connectors openings.

5. A method for cooling an electric motor within an electrically variable transmission comprising:
directing pressurized fluid from a main transmission cooling system through a first passageway formed in a first transmission component onto a first plurality of connectors for a first electric motor; and
wherein the first passageway defines an orifice located adjacent to the first plurality of connectors; and
wherein directing pressurized fluid onto the first plurality of connectors includes spraying the pressurized fluid from the orifice onto at least one of the first plurality of connectors.

6. The method of claim 5, wherein directing fluid from within the first passageway further includes providing a first terminal block defining a first plurality of connector openings and directing the fluid from the first passageway within the first plurality of connector openings.

7. The method of claim 6, wherein the terminal block defines a plurality of terminal block passageways, and where the terminal block passageways are fluidly connected with the first plurality of connectors openings.

8. The method of claim 5, further comprising:
directing pressurized fluid from a main transmission cooling system through second passageway formed in a second transmission component onto a second plurality of connectors for a second electric motor.

9. The method of claim 8, wherein directing fluid from within the second passageway further includes providing a second terminal block defining a second plurality of connector openings and directing the fluid from the second passageway within the second plurality of connector openings.

10. A method for cooling a plurality of electric motors comprising:
directing pressurized fluid from a cooling system through first passageway formed in a first component onto a first plurality of connectors for a first electric motor; and directing pressurized fluid from a cooling system through second passageway formed in a second component onto a second plurality of connectors for a second electric motor; and wherein the first passageway defines a first orifice located adjacent to the first plurality of connectors, and the second passageway defines a second orifice located adjacent to the second plurality of connectors;

wherein directing pressurized fluid onto the first plurality of connectors includes spraying the pressurized fluid from the first orifice onto at least one of the first plurality of connectors; and wherein directing pressurized fluid onto the second plurality of connectors includes spraying the pressurized fluid from the second orifice onto at least one of the first plurality of connectors.

11. The method of claim 10, wherein the first component is a first transmission component and the cooling system is a main transmission cooling system.

12. The method of claim 10, wherein the second component is a second transmission component and the cooling system is a main transmission cooling system.

13. The method of claim 10, wherein directing fluid from within the first passageway further includes providing a first terminal block defining a first plurality of connector openings and directing the fluid from the first passageway within the first plurality of connector openings.

14. The method of claim 13, wherein the directing fluid from within the first passageway further includes defining a first plurality of terminal block passageways, wherein the first plurality of terminal block passageways are fluidly connected with the first plurality of connectors openings.

15. The method of claim 10, wherein directing fluid from within the second passageway further includes providing a second terminal block defining a second plurality of connector openings and directing the fluid from the second passageway within the second plurality of connector openings.

16. The method of claim 15 wherein directing fluid from within the second passageway further includes defining a second plurality of terminal block passageways, wherein the second plurality of terminal block passageways are fluidly connected with the second plurality of connectors openings.

* * * * *